United States Patent Office 3,026,366
Patented Mar. 20, 1962

3,026,366
SEPARATORS FOR ELECTRIC STORAGE
BATTERIES
Ernest J. Comeau, Jr., Andover, and Joseph P. Dankese, Dorchester, Mass., assignors to W. R. Grace & Co., Cambridge, Mass., a corporation of Connecticut
No Drawing. Filed May 2, 1960, Ser. No. 25,863
11 Claims. (Cl. 136—145)

This invention relates to separators for electric storage batteries, and more particularly to separators to which reinforcing ribs have been adhesively attached.

The battery separators in most common use today are provided with a plurality of ribs on at least one face of the separator in order to reinforce and strengthen the porous separator material. In addition, the ribs provide channels for the escape of the gases formed during discharge of the battery and for the settling of the material which is often sloughed off the battery plates. These ribs have been formed in a variety of ways.

In the widely used resin-impregnated porous fibrous web separators, the ribs are formed integrally with the separator by corrugating, folding or otherwise displacing the separator material into upstanding ribs. Separators of this type, while they have low electrical resistance and are not subject to attack by the battery acid, leave something to be desired from the standpoint of strength and ruggedness.

Separately formed ribs, as for example, strips of rubber or resin-impregnated paper, have in certain instances been applied to the flat separator material and adhesively secured thereto. A more recent development has been the application to the separators of extruded ribs which are formed from a viscous liquid or semi-solid resinous material and later hardened by the application of heat. Plastisol compositions, B-stage phenol formaldehyde resin emulsions and certain polymer latices have been used for this purpose, ordinarily with the addition of substantial quantities of filler. The fillers may, if desired, be porous, water-absorptive materials, and may be saturated with water prior to their addition to the resin mixture so that on drying a porous rib will result. Alternatively, in cases where it is not desired to make the ribs porous, anhydrous fillers may be used. In one recent development, very highly plasticized vinyl chloride ribs are given the additional property of swelling during use by the inclusion of mineral fillers which swell in acid, thus providing a means of tightening the battery pack without the use of shims. In another development, ribs made up of powdered resinous materials together with fillers are applied to the face of the separator material and then heated to sinter the resin and bind the filler material together.

In all these methods, the resin in the rib compositions is hardened or converted into a solid mass by the application of heat after the ribs are applied to the battery separator. The resins used in the ribs first become more liquid as they are heated up to the point where cure, thermosetting, drying or sintering takes place, with the result that the ribs frequently slump or lose their sharp contour before the actual hardening can begin. Even a small amount of slump tends to produce ribs of uneven height. In addition, as the ribs slump, they tend to spread out over a larger area of the separator surface. If the rib material is non-porous, this will result in a serious increase in the electrical resistance of the separator. Slumping of the ribs, therefore, makes the separators unsatisfactory in performance and unacceptable to the trade.

It is an object of our invention to provide reinforcing ribs for battery separators which do not require the application of heat to set or harden the ribs after their application to the separator material. A further object of our invention is to provide ribs for battery separators which are tough, strong, heat-resistant, inexpensive, easy to apply and which maintain their exact contour after application to the separator material. A particular object of our invention is to provide ribs which have the property of swelling in battery acid in order to tighten the cell pack.

We have discovered that a rib-forming material of superior properties may be made by throughly intermilling a mixture of a tough solid resinous material and a rubbery polymer with a large proportion of an anhydrous mineral filler. This homogeneous, intermilled resin-rubber-filler mixture is then extruded in the form of ribs which are adhesively secured to the flat sheet of porous separator material. Although the ribs themselves are non-porous, we have found that their excellent performance in other respects more than compensates for the reduction in area of porous material available in the battery separator.

Our invention will be more clearly understood by reference to the following examples.

*Example I*

23.3 parts by weight of high (0.96) density polyethylene in pellet form was placed on a two roll mill heated to 300° F. The polyethylene was milled until it formed a softened sheet, at which time 13.1 parts of polyisobutylene was added, piece by piece, and milling was continued until a homogeneous sheet was obtained. 63.6 parts of anhydrous calcium sulfate of a fineness which would pass a 325 mesh screen was added to the resin-rubber mixture, and milling was continued for about 20 minutes or until the filler was very uniformly dispersed in the mixture. The milled mass was then removed from the rolls, cooled and ground to $3/16$ inch particle size in a Cumberland grinder.

Battery separator sheet material was made by impregnating a porous cellulosic web with an A-stage phenol formaldehyde resin solution in the manner well-known in the art, and the impregnated web was heated to 400° F. for 10 seconds to effect a partial cure of the resin. Eight equally spaced lines of a plastisol adhesive composition were applied to the paper in the locations where the ribs were to be applied, by means of a series of applicator rolls.

The intermiller resin-rubber-filler compound was fed to a screw extruder equipped with a special multi-orifice die and positioned in such a way that the extruded ribs were applied directly to the battery separator material along the previously-applied lines of adhesive. The ribbed material was then heated in an oven at 400° F. for 20 seconds to finish curing the phenol-formaldehyde resin and to flux the plastisol adhesive.

The ribs which were applied to the separator material by the process of Example I were strong, tough, flexible and maintained the exact size and contour imposed on them by the shape of the die opening, not only during their manufacture but during the entire life of the separator. Specifically, the ribs had enough heat resistance so that they did not soften or slump during the step of curing the phenol-formaldehyde resin in the separator. They were found to adhere strongly to the separator material even after prolonged immersion in battery acid.

*Example II*

The process of Example I was followed, using 29 parts by weight of high density polyethylene, 4.3 parts of polyisobutylene, and 66.7 parts of calcium sulfate. The resulting ribs were similar to those made by Example I except that they were considerably less flexible due to the lower amount of rubbery polymer and the higher filler loading, and were even more heat resistant than the ribs of Example I.

Example III

High density polyethylene and butyl rubber were milled together in a ratio of 22 parts of polyethylene to 10 parts of butyl rubber. 68 parts of finely divided calcium sulfate was added, and the resin-rubber-filler mix was inter-milled and extruded according to the directions of Example I.

The battery separator sheet material was striped with lines of a solvent-based rubber cement. The ribs were extruded onto the separator material along the lines of adhesive, and the separator material was passed through an oven as shown in Example I to cure the phenol-formaldehyde resin and to remove the solvent from the adhesive.

The resulting ribs were tough, strong, flexible, adhered well to the separator material and exhibited excellent acid- and heat-resistance.

Example IV

The process of Example III was followed, using 24 parts by weight of high density polyethylene, 6 parts by weight of butyl rubber, and 70 parts by weight of calcium sulfate. The resulting ribs were tough, strong, adhered well to the separator material, and exhibited excellent acid- and heat-resistance.

Example V

The process of Example III was followed, using 20 parts of low (0.92) density polyethylene, 10 parts of butyl rubber, and 70 parts of anhydrous, finely divided calcium sulfate. The resulting ribs were similar to those of Example III, except that they were considerably more flexible and somewhat less heat resistant.

Example VI

The process of Example III was followed, using 18 parts of high density polyethylene, 18 parts of butyl rubber, and 64 parts of anhydrous, finely divided calcium sulfate. The resulting ribs were characterized by exceptional flexibility and resistance to damage by flexing and bending. In other respects, they were similar to the ribs of Example III.

Example VII

The process of Example III was followed, using 12 parts of high density polyethylene, 18 parts of butyl rubber and 70 parts of anhydrous, finely divided calcium sulfate. The resulting ribs, like those of Example VI, were particularly characterized by their flexibility and flexural strength.

The mineral filler in the rib-forming composition of our invention provides a large proportion of the structural strength and resistance to heat-deformation of the ribs, as well as reducing the initial cost of the rib material. We have found that in order to obtain the desired properties in the finished rib, the finely divided mineral filler must be present in an amount of at least about 150 percent of the weight of the resinous component, i.e., the mixture of resinous and rubbery polymers in the rib material. The proportion of filler may be increased if desired up to about 300 percent. When quantities of filler in excess of 300 percent are used, however, the resulting compound is non-homogeneous and has a tendency to form blisters during the milling operation. Ribs formed from such a compound, moreover, show both lower tensile strength and lower resistance to acid than ribs extruded from compositions containing from 150 to 300 percent of filler based on the weight of the resinous component.

Because the mineral filler forms such a large proportion of our rib composition, it is particularly necessary that the filler be of a high degree of purity and completely safe for battery use. Fillers which are leached out by or react with battery acid, thereby introducing deleterious ions into the battery, may not be used. Examples of such deleterious ions are the chloride, nitrate, acetate and ammonium ions. Iron, copper and manganese are also harmful to the battery action. Because of the large amounts of such impurities which they contain, we have not found it possible to use the natural fillers such as clays and diatomaceous earth. Highly purified anhydrous calcium and barium sulfates are the only fillers which have been found to give satisfactory performance in the high filler-loaded compositions of our invention. In certain instances, a part of the filler may be replaced by high purity calcium or barium carbonate, as will be described below.

The fillers to be used in our rib-forming compositions must be very finely divided in order for the compositions to have the necessary homogeneity and cohesiveness. We have found that very satisfactory results may be obtained by using a filler which will pass a 325 mesh screen, as shown in the examples, although somewhat coarser fillers may also be used. Another important requirement is that the fillers be anhydrous, since the presence of excessive moisture during the intermilling step leads to blistering and inhomogeneity of the rib-forming mixture and uncontrolled porosity of the ribs.

The resinous material which is to be used in our new rib-forming composition must meet very stringent requirements. It must be acid-resistant, tough, strong, and above all it must have a very high degree of resistance to heat because of the high temperatures to which the resin is exposed during the process of intermilling with the filler. A large number of resinous materials, for example high styrene (85%) butadiene-styrene rubber and a 50–50 butadiene-styrene rubber, have been found to be unable to withstand such drastic treatment, and to char or become tacky during the milling step. Other resins which had the necessary heat-resistance, for example the butadiene-acrylonitrile rubbers, would not form homogeneous mixtures with such large quantities of filler, and therefore could not be used in the rib-forming composition of our invention. Only polyethylene was found to have the combination of characteristics necessary for our invention. Furthermore, while either low density or high density polyethylene may be used, the high density resin is preferred because of its greater degree of heat resistance.

We have found, furthermore, that simple compositions of polyethylene with such large proportions of filler are too short and crumbly and do not have the cohesiveness necessary for the extrusion of strong, adherent reinforcing ribs. The addition of a flexibilizing rubbery polymer, i.e. the polyisobutylene or butyl rubber (isobutylene copolymerized with a minor proportion of isoprene) shown in the preceding examples, to the polyethylene-filler mixture gives it the necessary cohesiveness. These two rubbery polymers have been found to have the necessary resistance to high temperatures and milling, and are also resistant to attack by battery acid. Other rubbery polymers tested, for example the various butadiene-styrene rubbers, were unsatisfactory in either temperature- or acid-resistance, and hence could not be used.

The proportion of rubbery polymer in the resinous component of the rib-forming composition is an important factor in the manufacture of our improved extruded ribs. While satisfactory ribs have been made with as little as 10 percent of rubbery polymer in the resinous component, we prefer in most cases to use the more flexible compositions obtained by incorporating at least about 20 percent of rubbery polymer in the resinous component. The amount of rubbery polymer may be increased to about 65% or even to 70% of the resinous component if desired. Compositions containing more than about 70 percent of rubber, however, have not been found to be satisfactory. Ribs formed of such compositions are too soft and have a strong tendency to flatten out in use, thus reducing their effectiveness to provide either mechanical strength or channels for the flow of battery electrolyte. Compositions containing from about 20 percent to about 40 percent of rubbery polymer and from about 80 percent to about 60 percent of high density polyethylene have adequate flexibility and are also particularly resistant to heat-softening, and for this reason constitute a preferred form of our invention.

Difficulties may be encountered during the milling step due to the tendency of the resin-rubber-filler compositions of our invention to stick to the heated rolls of the mill. This may be overcome by the inclusion in the composition of a small portion, i.e. 0.5 part by weight, of calcium stearate or any of the many well-known lubricants for resinous compositions.

The extruded ribs made according to our invention may be bonded to the separator material by a plastisol adhesive as shown in Example I, by a solvent-based rubber adhesive as shown in Example III or by any other suitable adhesive material. The type of adhesive and the method of its application may be determined by a person skilled in the art and hence do not form a part of our invention.

One of the particular advantages of the separators of our invention is that the separator ribs may be given the property of swelling in battery acid, thus providing an automatic tightening of the cell elements within the battery case. Batteries made with such self-tightening separators show improved performance under conditions of use involving excessive vibration.

The property of swelling may be imparted to the rib-forming composition by incorporating in the compound a filler which swells on contact with sulfuric acid. Calcium carbonate and barium carbonate have been found to have this property, and to impart the characteristic of swelling to the rib-forming composition of our invention. In general, the substitution of one part by weight of calcium or barium carbonate for an equivalent weight of the main filler of the composition results in about a one percent swelling of the ribs on immersion in sulfuric acid. The desired degree of swelling may be achieved, therefore, by adding an appropriate amount of swelling filler to the compound. We have found, however, that not more than about 20 parts of the filler may be replaced by a swelling filler, since rib compositions containing more than 20 parts of swelling filler expand so much that they lack strength and even disintegrate in battery acid. For best results we prefer to substitute about 10 parts of carbonate filler for an equivalent amount of the sulfate.

We believe that the carbonate filler reacts with the sulfuric acid in the battery and is converted into calcium or barium sulfate. Since the mole volume of the sulfate is greater than that of the corresponding carbonate, the rib composition will occupy a larger volume after the conversion to the sulfate has taken place. If this theory is correct, any filler which is converted on exposure to battery acid into a substance which occupies a larger volume than the original filler, should impart to the rib composition the property of expanding in acid. The choice of expanding filler is limited, however, by the considerations pointed out above, i.e. that no harmful ions be introduced into the battery. For this reason, we are not able to use certain naturally occurring expanding fillers such as for example Wollastonite, in the rib-forming composition of our invention.

This portion of our invention will be more clearly understood by reference to the following example.

*Example VIII*

The process of Example IV was followed, substituting about 10 parts by weight of calcium carbonate for an equal amount of the calcium sulfate filler. The resulting ribs were identical in every respect with those of Example IV except that when the separator was immersed in battery acid, swelling of the rib composition took place and the height of the ribs was increased by about 10 percent. This swelling was sufficient to close the spaces between the battery plates and the separators in the cell elements of a battery, providing a tight, vibration-resistant cell pack.

Ribs extruded from the intermilled compositions described above are strong, tough, and resistant to deformation and to attack by battery acid. They require no heat-hardening or setting step, and maintain their sharp contours throughout manufacture and during the entire life of the separator. Separators reinforced by such ribs have been found to give outstanding performance even under particularly stringent conditions of use. In addition, separators reinforced by ribs of the compositions of Examples I through IV are particularly resistant to deformation on heating, and ribs made according to Example VIII have the additional advantage of swelling on contact with battery acid thus providing an automatically tightened cell pack.

Although the preceding examples have shown the formation of reinforcing ribs by extrusion of the intermilled resin-rubber-filler mixture, we may, if desired, use the alternative method of sheeting out the milled rib-forming composition and cutting it into strips which are then adhesively secured to the separator material. Ribs formed in this manner, like the extruded ribs, possess the highly advantageous properties of toughness, strength and resistance to deformation which are inherent in the rib-forming composition of our invention.

We claim:

1. A separator for electric storage batteries which includes a plurality of non-porous, separately formed ribs adhesively secured to the face of the separator, said ribs being composed of an intimately milled mixture of a resinous component which contains from about 30 percent to about 90 percent of polyethylene and from about 70 percent to about 10 percent of a rubbery polymer selected from the class consisting of polyisobutylene and butyl rubber, together with from about 150 percent to about 300 percent based on the weight of the resinous component, of an anhydrous finely divided filler selected from the class consisting of calcium sulfate and barium sulfate.

2. A separator for electric storage batteries which comprises a resin-impregnated porous fibrous web, having adhesively secured to at least one face thereof non-porous, separately formed ribs composed of an intimately milled mixture of a resinous component which contains from about 30 percent to about 90 percent of polyethylene and from about 70 percent to about 10 percent of a rubbery polymer selected from the class consisting of polyisobutylene and butyl rubber, together with from about 150 percent to about 300 percent based on the weight of the resinous component, of an anhydrous finely divided filler selected from the class consisting of calcium sulfate and barium sulfate.

3. The separator of claim 1 in which the resinous component contains from about 60 percent to about 80 percent of high density polyethylene and from about 40 percent to about 20 percent of the said rubbery polymer.

4. The separator of claim 1 in which the anhydrous finely divided filler is calcium sulfate.

5. The separator of claim 1 in which at least a part of the said finely divided filler has been replaced by a filler which has the property of expanding when placed in contact with battery electrolyte.

6. The separator of claim 5 in which the expanding filler is selected from the group consisting of calcium carbonate and barium carbonate.

7. The separator of claim 6 in which the expanding filler is calcium carbonate.

8. The process for making a ribbed battery separator which includes the steps of intermilling a mixture of from about 60 to about 75 parts by weight of an anhydrous finely divided filler selected from the class consisting of calcium sulfate and barium sulfate, and from about 40 to about 25 parts by weight of a resinous mixture which contains from about 30 percent to about 90 percent of polyethylene and from about 70 percent to about 10 percent of a rubbery polymer selected from the class consisting of polyisobutylene and butyl rubber, extruding the intermilled mixture directly onto a sheet of battery separator material in the form of a plurality of ribs, and adhesively securing the said ribs to the said battery separator material.

9. The process of claim 8 in which an adhesive composition is first applied to the face of the separator material in the form of a plurality of stripes of the adhesive composition and the extruded ribs are then applied to the separator material in lines coincident with the stripes of the adhesive composition.

10. The process of claim 8 in which not more than about 20 parts of the finely divided anhydrous filler is replaced by a filler which has the property of expanding when placed in contact with battery electrolyte.

11. The process of claim 10 in which the expanding filler is calcium carbonate.

References Cited in the file of this patent

UNITED STATES PATENTS

| | | |
|---|---|---|
| 1,942,183 | Muller | Jan. 2, 1934 |
| 2,531,504 | Dillehay et al. | Nov. 28, 1950 |
| 2,810,775 | Raphael | Oct. 22, 1957 |
| 2,936,328 | Sillcox et al. | May 10, 1960 |